US012223397B2

(12) United States Patent
Vaid et al.

(10) Patent No.: US 12,223,397 B2
(45) Date of Patent: Feb. 11, 2025

(54) ACTION DETERMINATION USING RECOMMENDATIONS BASED ON PREDICTION OF SENSOR-BASED SYSTEMS

(71) Applicant: Oracle International Corporation, Redwood Shores, CA (US)

(72) Inventors: Amit Vaid, Bengaluru (IN); Vijayalakshmi Krishnamurthy, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1032 days.

(21) Appl. No.: 17/007,601

(22) Filed: Aug. 31, 2020

(65) Prior Publication Data

US 2022/0067572 A1    Mar. 3, 2022

(51) Int. Cl.
  *G06N 5/022*   (2023.01)
  *G06F 16/28*   (2019.01)
  *G06F 18/214*  (2023.01)
  *G06F 40/143*  (2020.01)
  *G06F 40/35*   (2020.01)
  *G06F 40/58*   (2020.01)
  *G06N 3/042*   (2023.01)
  *G06N 20/00*   (2019.01)

(52) U.S. Cl.
  CPC .......... *G06N 20/00* (2019.01); *G06F 16/284* (2019.01); *G06F 18/214* (2023.01)

(58) Field of Classification Search
  CPC ...... G06N 20/00; G06F 18/214; G06F 18/241
  See application file for complete search history.

(56) References Cited

U.S. PATENT DOCUMENTS

| | | | | |
|---|---|---|---|---|
| 2005/0096950 A1* | 5/2005 | Caplan | ............. | G06Q 10/06395 705/7.41 |
| 2009/0063431 A1* | 3/2009 | Erol | ...................... | G06V 10/993 |
| 2010/0218108 A1* | 8/2010 | Crabtree | ................ | G06Q 50/06 715/738 |
| 2010/0332373 A1* | 12/2010 | Crabtree | ................ | G06Q 40/04 709/224 |
| 2012/0232685 A1* | 9/2012 | Wang | ..................... | B22D 46/00 700/98 |
| 2015/0094968 A1* | 4/2015 | Jia | .......................... | G05B 15/02 702/60 |
| 2016/0055236 A1* | 2/2016 | Frank | ...................... | G06F 40/35 707/748 |
| 2016/0300252 A1* | 10/2016 | Frank | .................. | G06F 21/6245 |
| 2020/0329062 A1* | 10/2020 | Beauchesne | .......... | H04L 63/105 |
| 2021/0157312 A1* | 5/2021 | Cella | .................... | G01M 13/045 |

* cited by examiner

*Primary Examiner* — Brandon S Cole
(74) *Attorney, Agent, or Firm* — Invoke

(57) ABSTRACT

Techniques for providing actionable recommendations for configuring system parameters are disclosed. A set of environmental constraints and a set of values for a set of parameters for a target device is applied to a machine learning model to predict a first performance value of the target device. Candidate values for the set of parameters are identified that are within a threshold range from the first set of values in a multi-dimensional space. For each particular candidate set of values of the candidate sets of values the machine learning model to predicts a performance value of the target device and identifies a subset of the candidate sets of values with corresponding performance values that meet a performance criteria. A subset of candidate sets of values that meets performance criteria is provided as a recommendation.

21 Claims, 10 Drawing Sheets

ACTION DETERMINATION USING RECOMMENDATIONS BASED ON PREDICTION OF SENSOR-BASED SYSTEMS

TECHNICAL FIELD

The present disclosure relates to selecting parameters for providing predictions in sensor-based systems. In particular, the present disclosure relates to selecting parameters for predictions as a function of a range from a set of given values in a sensor-based system.

BACKGROUND

With the increase in the number of devices connected to the Internet, the Internet of Things (IoT) provides a broad data pool from which entities may obtain data to analyze processes. Data obtained from different types of sensors, monitors, and other sources is used to monitor systems and is analyzed to make the systems operate more effectively.

With the broad data pool available, it can be difficult to which data sources are the most effective to monitor a given system. In addition, it can be difficult to determine which features of a system an operator should modify to improve operation of the system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
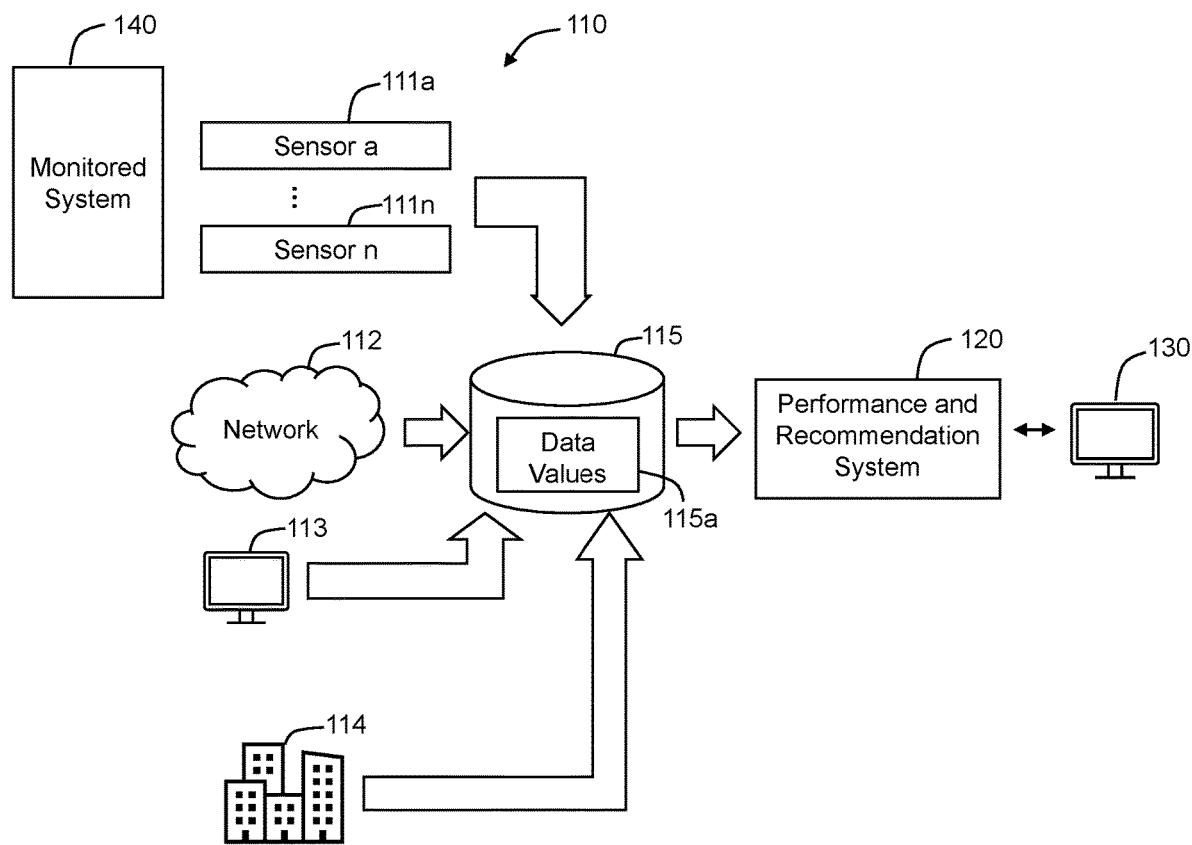
FIG. 1A illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. PROVIDING RECOMMENDATIONS FOR CONFIGURABLE SYSTEM PARAMETERS
4. ASSIGNING WEIGHTS TO SYSTEM PARAMETERS
5. EXAMPLE EMBODIMENT OF TRAINING SECOND MACHINE LEARNING MODEL
6. EXAMPLE EMBODIMENT OF PROVIDING ACTIONABLE RECOMMENDATIONS FOR CONFIGURABLE SYSTEM PARAMETERS
7. COMPUTER NETWORKS AND CLOUD NETWORKS
8. MISCELLANEOUS; EXTENSIONS
9. HARDWARE OVERVIEW

1. General Overview

One or more embodiments use a machine learning model to modify configuration parameter values for improving the performance of a target system. Configuration parameter values may include parameter values that are set via user input. Configuration parameter values may include operating values that can be detected with a sensor, and result from user-set parameter values. As an example, a configuration parameter value may include ambient temperature within a building that is the function of an HVAC system configured via user input.

A Prediction and Recommendation System (PR system) first trains a machine learning model to predict performance of a target system given a set of environmental constraints and a current set of configuration parameter values. If the predicted performance, based on the current set of configuration parameter values, does not meet a performance criteria, the PR system submits alternate sets of configuration parameter values to the machine learning model to predict corresponding performance. The PR system may also test alternate sets of configuration parameter values in an effort to improve performance, even if the predicted performance based on the current configuration parameter values meets the performance criteria.

The PR system selects the alternate sets of configuration parameter values for testing performance based on the current set of configuration parameter values. In an example, a new value of a parameter may be a percentage increase or decrease, or an absolute value increase or decrease from a current value of the parameter. Alternatively, or additionally, the PR system may select a particular alternate set of configuration parameter values within a threshold distance from the current set of configuration parameter values in a multi-dimensional space. The particular alternate set of configuration parameter values may be based on historical performance data being available for the particular alternate set of configuration parameter values.

Once the PR system identifies a subset of the alternate sets of configuration parameter values that either (a) meet the performance criteria and/or (b) improve performance of the target system in comparison to the current set of configuration parameter values, the system generates an actionable recommendation. The PR system may recommend the subset of the alternate sets of configuration parameter values for modification of the configuration parameters. The PR system may recommend a portion of a multi-dimensional space, that includes the subset of the alternate sets of configuration parameter values, for configuring the configuration parameters.

One or more embodiments compute the alternate set of configuration parameter values based on a separate machine learning model that predicts configuration parameter values as a function of environmental constraints and target performance. The PR system may define a multi-dimensional space representing different sets of configuration parameter values within a proximity of a point in the multi-dimensional space that represents the current set of configuration parameter values. Environmental constraints, and multi-dimensional configuration parameter space are applied to the machine learning model to generate the alternate set of configuration parameter values.

One or more embodiments described in this Specification and/or recited in the claims may not be included in this General Overview section.

2. Architectural Overview

A data monitoring system obtains data from multiple sources in multiple different formats and having different granularity. The data monitoring system analyzes the data to provide optimized recommendations to a user for potential modifications to a device or system being monitored by the user.

FIG. 1A illustrates a system 100 in accordance with one or more embodiments. As illustrated in FIG. 1A, system 100 includes one or more data sources 110, a data monitoring system 120, and a user terminal 130.

The data sources include sensors 111a to 111n, a network 112, a user terminal 113, and organizations 114. The sensors 111a to 111n sense characteristics of a monitored system 140. In one embodiment, the data sources are connected to the Internet or one or more additional/other networks. The data is stored in a data repository 115 as data values 115a.

The prediction and recommendation system (PR system) 120 obtains the data values 115a pertaining to the monitored system 140 from the data repository 115, or directly from sensors 111a to 111n. The PR system 120 analyzes the data values 115a to determine the status of the monitored system 140. The PR system 120 uses the data values 115a to make predictions regarding the performance of the monitored system 140. Based on the predictions, the PR system may generate actionable recommendations for presentation on the user terminal 130. Examples of actionable recommendations include modifying hardware or software components of the monitored system 140 or modifying operating parameters of the current hardware or software components.

Figure 1B:
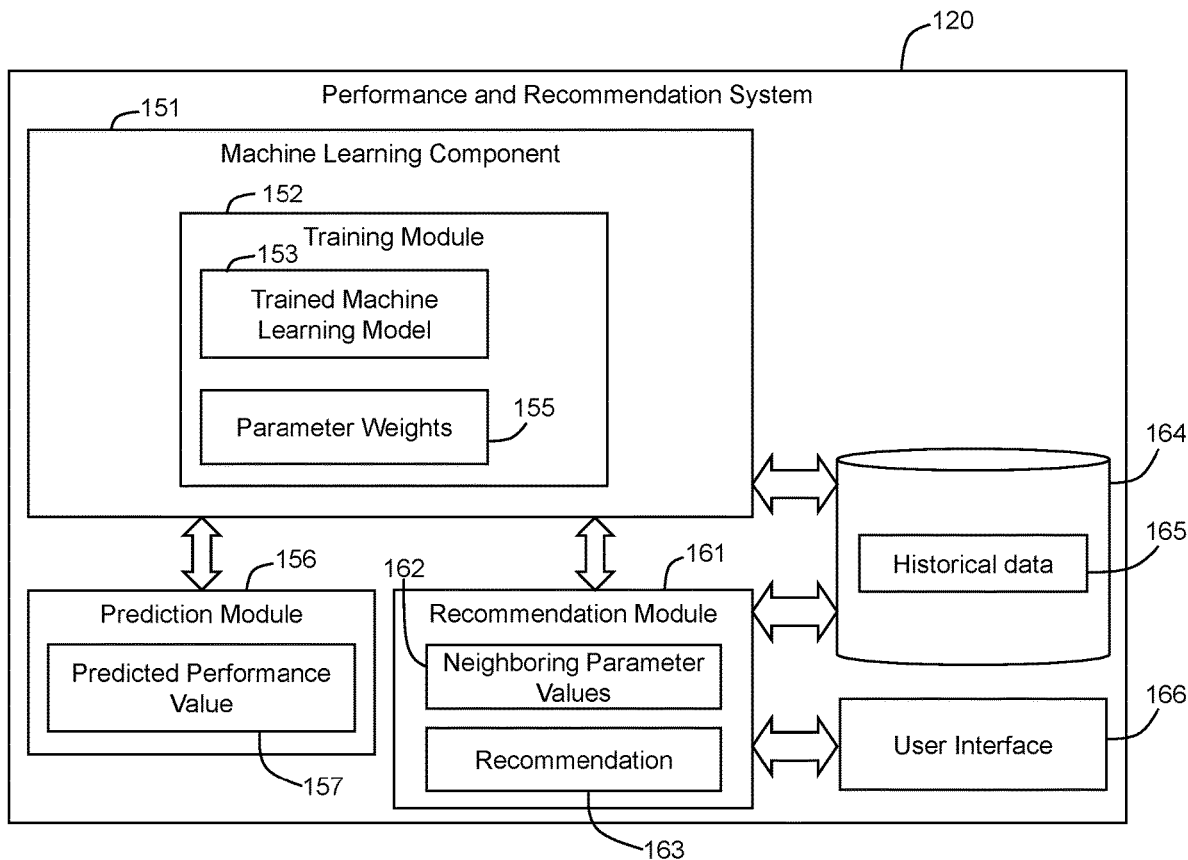
FIG. 1B illustrates a prediction and recommendation system in accordance with one or more embodiments.

FIG. 1B illustrates the PR system 120 in further detail, according to one or more embodiments. The PR system 120 includes a machine learning component 151, a prediction module 156, a recommendation module 161, a data repository 164, and a user interface 166.

The data repository 164 stores historical data 165. The historical data 165 may be obtained from the data values 115a obtained from the data sources 110 of FIG. 1A. The data repository 164 further stores trained machine learning models 153 from the training module 152, predicted performance values 157 from the prediction module 156, and recommendations 163 from the recommendation module 161.

In one embodiment, the predicted performance is a prediction of success/failure of a device or system. In another embodiment, the predicted performance is a prediction of whether the device or system is operating within a threshold performance range. In another embodiment, the predicted performance is a prediction of whether the device or system meets performance criteria.

The machine learning component 151 includes the training module 152 for training one or more machine learning models 153 using the historical data 165. While training machine learning models, the training module 152 determines relationships between the parameter values and the performance of the monitored system. The training module 152 may further determine an influence of a parameter on the performance of the monitored system. The training module 152 stores values representing parameter weights 155 based on the influence of parameters on the performance of the monitored system.

The prediction module 156 generates a predicted performance value 157, or a prediction of a monitored system based on sets of parameter values, The prediction module 156 generates the predicted performance value 157 using one of the machine learning models 153 trained by the training module 152. The predicted performance value 157 may also be based on one or more parameters provided by a user using the user interface 166.

The performance value may be a binary value, such as success/failure, or any other type of value for which a user desires a recommendation. For example, the performance value may be a result of comparing a numerical value to a threshold, or the performance value may be any other value within a range determined by the configurable parameters.

In one embodiment, the training module 152 trains a first trained machine learning model 153 using the historical data 165. The prediction module 156 uses the first trained machine learning model 153 to generate one or more predicted performance values 157. For example, the prediction module 156 may determine that a set of combinations of parameters results in performance values 157 above or below predetermined thresholds. Alternatively, the performance values may represent either successful operation or failure of a monitored system 140.

The recommendation module 161 provides a recommendation 163 to a user, via the user interface 166, for one or more of parameters-to-be-analyzed, parameter values for the monitored system 140, modifications to the monitored system 140, or any other recommendation for operating the monitored system 140 or obtaining additional data for generating a recommendation.

In one embodiment, the recommendation module 161 obtains a given parameter or set of given parameters from one of the user interface 166 or the data repository 164 and generates the recommendation 163 based on the given parameter or set of given parameters. Using the given parameter(s), the recommendation module 161 determines a range of neighboring parameter values 162 for sampling. In one embodiment, the training module 152 trains a second trained machine learning model 154 using the range of neighboring parameter values 162 determined by the recommendation module 161.

In example embodiments, discussed in further detail in the description that follows, the range of neighboring parameter values 162 is determined based on one or more of the parameter weights 155, a predetermined linear space, a predetermined logarithmic space, or any combination of these.

In one or more embodiments, the system 100 may include more or fewer components than the components illustrated in FIGS. 1A and 1B. The components illustrated in FIGS. 1A and 1B may be local to or remote from each other. The components illustrated in FIGS. 1A and 1B may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

In one or more embodiments, a data repository 115 is any type of storage unit and/or device (e.g., a file system, database, collection of tables, or any other storage mechanism) for storing data. Further, a data repository 115 may include multiple different storage units and/or devices. The multiple different storage units and/or devices may or may not be of the same type or located at the same physical site. Further, a data repository 115 may be implemented or may execute on the same computing system as the PR system 120. Alternatively or additionally, a data repository 115 may be implemented or executed on a computing system separate from the PR system 120. A data repository 115 may be communicatively coupled to the PR system 120 via a direct connection or via a network.

In one or more embodiments, the PR system 120 refers to hardware and/or software configured to perform operations described herein for analyzing and presenting data. Examples of operations for analyzing data from multiple sources, and providing a recommendation to users are described below with reference to FIG. 2.

In an embodiment, the PR system 120 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, interface 166 refers to hardware and/or software configured to facilitate communications between a user and the performance prediction system 120. The interface 166 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 166 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 166 is specified in one or more other languages, such as Java, C, or C++.

3. Providing Recommendations for Configurable System Parameters

Figure 2:
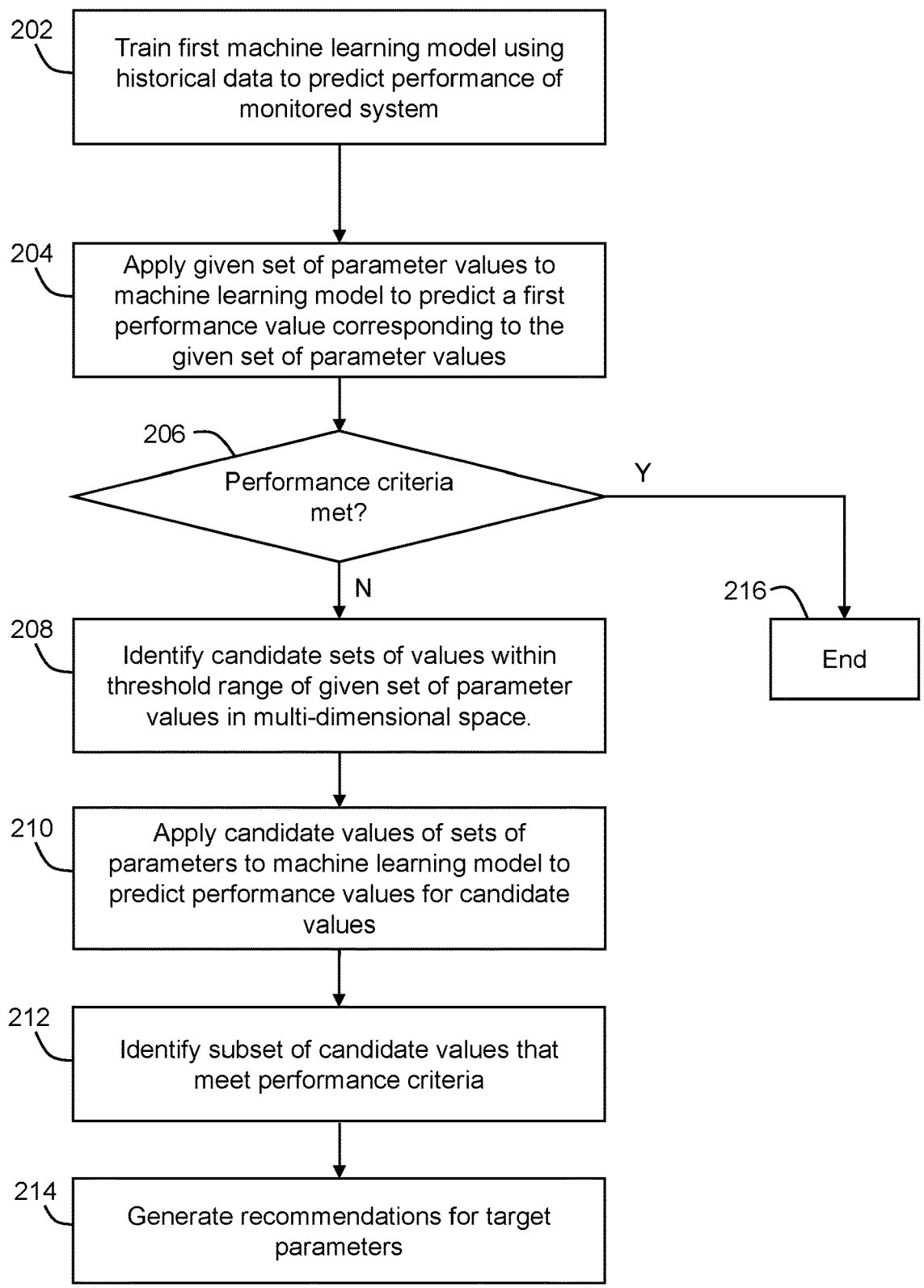
FIG. 2 illustrates an example set of operations for generating recommendations for target parameters in accordance with one or more embodiments.

FIG. 2 represents an example set of operations for providing a user with a recommendation for configuring system parameters in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A prediction and recommendation system (PR system) obtains data from various sources, including sensors monitoring a "monitored system." The monitored system may be any type of system, including a computer, an enterprise system running on many computers, electrical equipment, mechanical equipment, software systems running on one or more computers, or any other type of system capable of being monitored.

The PR system trains a machine learning model using the obtained data, referred to herein as historical data, to predict the performance of the monitored system given a set of environmental constraints, with different sets of parameter values (Operation 202).

In one embodiment, the PR system trains the machine learning model by submission of historical data to one or more machine learning algorithms. The system finds patterns in the historical data by systematically modifying variables in the algorithm to map input parameters of the historical data with target parameters.

In one embodiment, the system learns relationships between parameter values and the performance of the machine learning model. For example, the system may determine that one parameter, such as "power consumption" affects the performance of the model more than another parameter, such as "unit size." A parameter, or set of parameters, may have an influence on a machine learning model when the parameter value(s) have a predictable effect on the performance of the model.

The PR system applies a given set of parameter values to the machine learning model to predict the performance of the device or system at the given set of parameter values (Operation 204).

In one embodiment, the given set of parameter values are values for operating a monitored system, and the predicted performance is a prediction of an operating state of the monitored system, such as a success or failure of the monitored system. The given set of parameter values may be measured values, or values obtained from one or more of the data sources 110. In such an embodiment, the predicted performance may be a prediction of the operating state of the monitored system given the sensed or derived operating parameter values. Alternatively, a user may provide one or more of the given parameters to obtain the prediction of the operating state of the monitored system should the operating system be operated with the given operating parameter values.

The given set of parameter values may include predefined environmental constrains. These include any parameters that affect the performance value, but that may not be changed. For example, in an embodiment in which the monitored system is a computer system, fixed parameter values or environmental constraints may include the following: model type, form factor, environmental temperature, and location. However, in other embodiments any of these parameters may be configurable. For example, a system may have multiple different locations available for locating equipment, and a recommendation may include "location" as a configurable parameter.

The PR system analyzes the first performance value of the monitored system corresponding to the given parameter(s) to determine whether performance criteria are met (Operation 206). For example, in an embodiment in which the performance criteria are a binary "success/failure" determination, the PR system may determine whether the monitored system would operate successfully with the given parameter(s). In an alternative embodiment in which the performance criteria are located along a range of possible values (e.g. from 0%-100%), the PR system may determine whether the performance of the monitored system would fall within a predetermined range or would meet a predetermined threshold value.

If the PR system determines that the performance criteria are met, the process ends (Operation 216).

If the PR system determines that the performance criteria are not met, the PR system submits alternate sets of parameter values to the machine learning model to predict corresponding performance (Operation 208). The PR system defines the alternate sets of parameter values as candidate sets of values within a threshold range of the given set of parameter values in a multi-dimensional space. The PR system may also test alternate sets of configuration parameter values in an effort to improve performance, even if the predicted performance based on the given parameter values meets the performance criteria. In other words, in one or more embodiments, the process may skip operation 206 and proceed to operation 208, even if the PR system determines that the performance criteria are met.

In one or more embodiments, the parameters to which the candidate sets of values correspond may be selected from among the set of parameters used to train the machine learning model. One or more parameters that were previously used to train the machine learning model may be selected as target parameters for which the system will provide recommendations. The candidate sets of values may be provided for the target parameters.

In the present specification and claims, the neighborhood of the given set of parameter values refers to a predetermined range or combination of ranges of values of the parameters that correspond to the given parameters.

In one embodiment, a neighborhood around the given parameters is defined by a linear space around the given parameters. For example, the neighborhood may be defined by a range of +/−20% around the given set of parameter values. In another embodiment, the neighborhood around the given set of parameter values is defined by a logarithmic space around the given set of parameter values. In yet another embodiment, the neighborhood around the given set of parameter values may be a combination of a linear space and a logarithmic space around the given set of parameter values.

In one embodiment, the neighborhood around the given set of parameter values is defined by a process of clustering in combination with logarithmic and exponential sets of parameter values.

In one embodiment, a shape of the neighborhood around the given parameters is defined by the learned performance from training the machine learning model. For example, in an example in which the given parameters comprise two parameters, and the learned performance indicates that a first parameter has a greater influence on the performance value than the second parameter, the shape of the neighborhood may be logarithmic in a direction corresponding to the first value and linear in a direction corresponding to the second value. In other words, the shape of the neighborhood may result in sampling a more influential parameter more than less influential parameters.

In one embodiment, the system assigns a greater weight to more influential parameters during the learned performance of training the machine learning model, and the neighborhood around the given parameters is shaped according to the relative weights of the given parameters. In this embodiment, the system forms the neighborhood shape to include more samples of the parameters having greater weights than the parameters having lesser weights.

In one embodiment, the shape of the defined neighborhood based on the learned performance of training the machine learning model is an ellipse, where the longer direction of the ellipse corresponds to a first parameter having a greater weight than a second parameter on the performance value corresponding to the given parameters.

In one or more embodiments, the shape of the defined neighborhood around the given parameters has a shape that excludes parameter combinations with predetermined first performance values, or includes parameter combinations with only predetermined second performance values. For example, in an embodiment in which the performance value is an operational success or failure of a monitored system, the shape of the defined neighborhood may be configured to exclude parameter combinations for which the performance value is "failure."

One or more embodiments include multivariate systems, in which the number of given parameters in the set of given parameters is greater than two. In such embodiments, a number of dimensions of the neighborhood around the given set of parameter values is greater than two. The number of dimensions of the defined neighborhood around the given set of parameter values may correspond to the number of given parameter values. For example, in a system in which six different parameters are monitored and provided as given parameters, the neighborhood around the given parameters may be a six-dimensional shape defined by the learned performance of the six different parameters during the training of the machine learning model.

In one embodiment, the system identifies additional configurable parameters, other than the given set of parameters, that have been determined, based on the training of the first machine learning model, to have an influence on the performance value. The system may define a neighborhood around the given parameter values to include the additional configurable parameters, other than the given parameters. In one embodiment, upon identifying additional configurable parameters, the system may prompt a user to select, from among the configurable parameters, those parameters the user would like to use as the basis for recommendations of parameter values, as discussed in the paragraphs that follow. In such an embodiment, the system defines the neighborhood around the given parameter values based, in part, on user input.

The performance predicting system applies the candidate values within the defined neighborhood of the given parameter values to the machine learning model to predict performance values for the candidate values (Operation 210).

Based on the predicted performance values from applying the candidate values to the machine learning model, the system identifies a subset of candidate values for the target parameters that meets predetermined performance criteria (Operation 212).

Performance criteria include predetermined value levels of parameter values, for example.

The system generates recommendations for values for one or more target parameters based on the identified set of parameters having the target performance values (Operation 214). The recommendations may be a single recommendation for a set of target parameters or multiple potential recommendations for multiple sets of values for the target parameters.

In one embodiment, the recommended values for the sets of parameters includes changing the values of the given parameters to result in a different performance value. In another embodiment, the recommended values for the sets of parameters includes keeping the values of the given parameters the same, and recommending different values for parameters other than the given parameters. In yet another embodiment, the recommended values for parameters includes both recommendations in which the given parameters are maintained at the same values, and recommendations in which alternative values are recommended for the given parameters.

In one embodiment, one or more recommendations are provided to a user via a graphical user interface. A user may interact with the graphical user interface to obtain additional data regarding the recommended parameter values for the sets of parameters associated with each recommendation. In one embodiment, different recommendations are provided with different visual indicators to provide a user with information about the performance value of the recommendation. For example, one set of recommendations may have a green color representing a high-performance value or a high likelihood of success. Another set of recommendations may have a blue color representing a relatively lower performance value or relatively lower likelihood of success. Yet another set of recommendations may have an orange color, representing a lowest performance value or lowest likelihood of success.

In one embodiment, a user may move a cursor over an icon representing a recommendation to see recommended parameter values. In other embodiments, recommendations may be provided in the form of a chart, graph, table, any other visual method, or any other method perceptible to a user.

In one or more embodiments, recommendations may either be a contiguous range of values or a non-contiguous range of values. Table 1, below, provides examples of parameter values having contiguous and non-contiguous ranges.

TABLE 1

|  | Parameter 1 Values | Parameter 2 Values |
|---|---|---|
| Example 1 | 50-70 | 1-5 |
| Example 2 | 50-52 | 1-2 |
|  | 54-56 | 3-4 |
| Example 3 | 50-52 | 1-2 |
|  | 54-56 | 4 |

As shown in example 1 of table 1, the ranges of recommended values for parameters 1 and 2 are both contiguous. In example 2, the range of recommended values for parameter 1 is non-contiguous, while the range of recommended values for parameter 2 is contiguous. In example 3, the ranges of recommended values for both parameter 1 and parameter 2 are non-contiguous.

By the above operations, a first performance value obtained by running a first set of given parameters through a first machine learning model may be converted into actionable recommendations by defining a neighborhood of configurable parameters around the first set of given parameters and training a second machine learning model based on the defined neighborhood of configurable parameters and the performance value from the first set of given parameters.

4. Assigning Weights to System Parameters

As discussed above, a system may define the neighborhood around a given set of parameter values for providing actionable recommendations by learning relationships among system parameters while training a first machine learning model.

Figure 3:
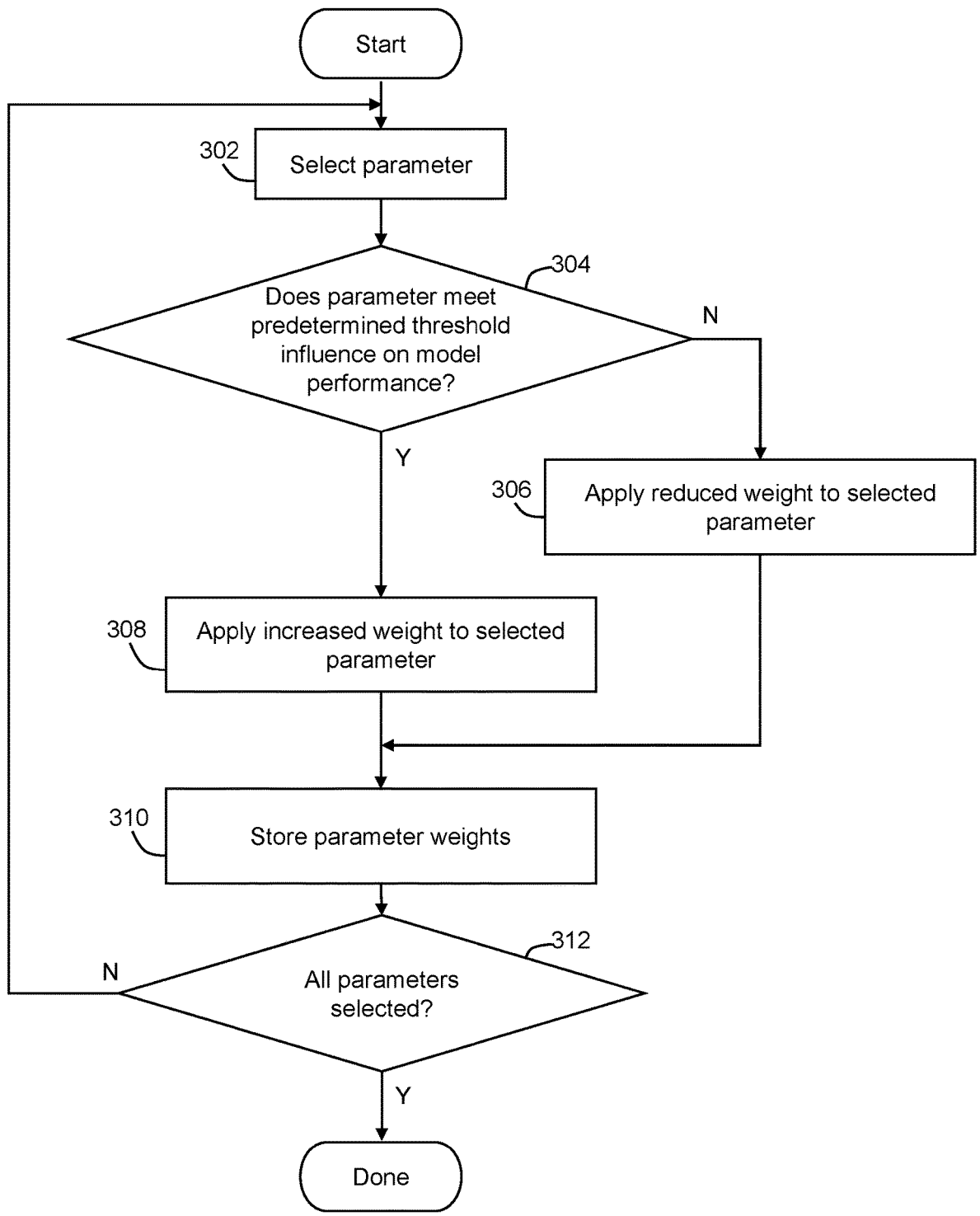
FIG. 3 illustrates an example set of operations for providing weights to parameters in accordance with one or more embodiments.

FIG. 3 illustrates an example set of operations for assigning weights to system parameters in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

In the process of training a first machine learning model, a system selects a parameter (Operation 302). The system analyzes the relationship between the selected parameter and performance of the model (Operation 304).

Analyzing the relationship between different parameters and the model performance includes, for example, identifying correlations between parameters and model performance, identifying an effect one parameter has on model performance, and identifying an influence one parameter has on model performance (such as the influence an change in value of one parameter has on a performance value of the model).

If the system determines that the selected parameter does not have a threshold relationship with model performance, the selected parameter is given a reduced weight (Operation 306). If the system determines that the selected parameter does have a threshold relationship with model performance, the selected parameter is given an increased weight (Operation 308). In the present specification, the "reduced weight" and "increased weight" describe values relative to each other. The "reduced weight" may be "0" or any other value less than the "increased weight." The reduced weight and increased weight may be binary values ("0" or "1") or values along any scale, such as from 1-100.

For example, in one embodiment, if the selected parameter is "temperature," and the other parameter is "monitored system operational," the system may learn, during training of the first machine learning model, that the "temperature"

parameter has a direct effect on model performance. In such an example, the parameter "temperature" may be assigned a relatively high weight.

Upon assigning weights to parameters, the system stores the parameter weights (Operation 310). The system may store the parameter weights in one or more tables or any other type of data structure to allow the system to identify the relationships, as represented by weight values, between different system parameters and model performance.

Upon storing the weight values, the system determines if each parameter has been selected (Operation 312) and assigned a weight value. Once each parameter has been assigned a weight value the process ends.

5. Example Embodiment of Training Second Machine Learning Model

Figure 4:
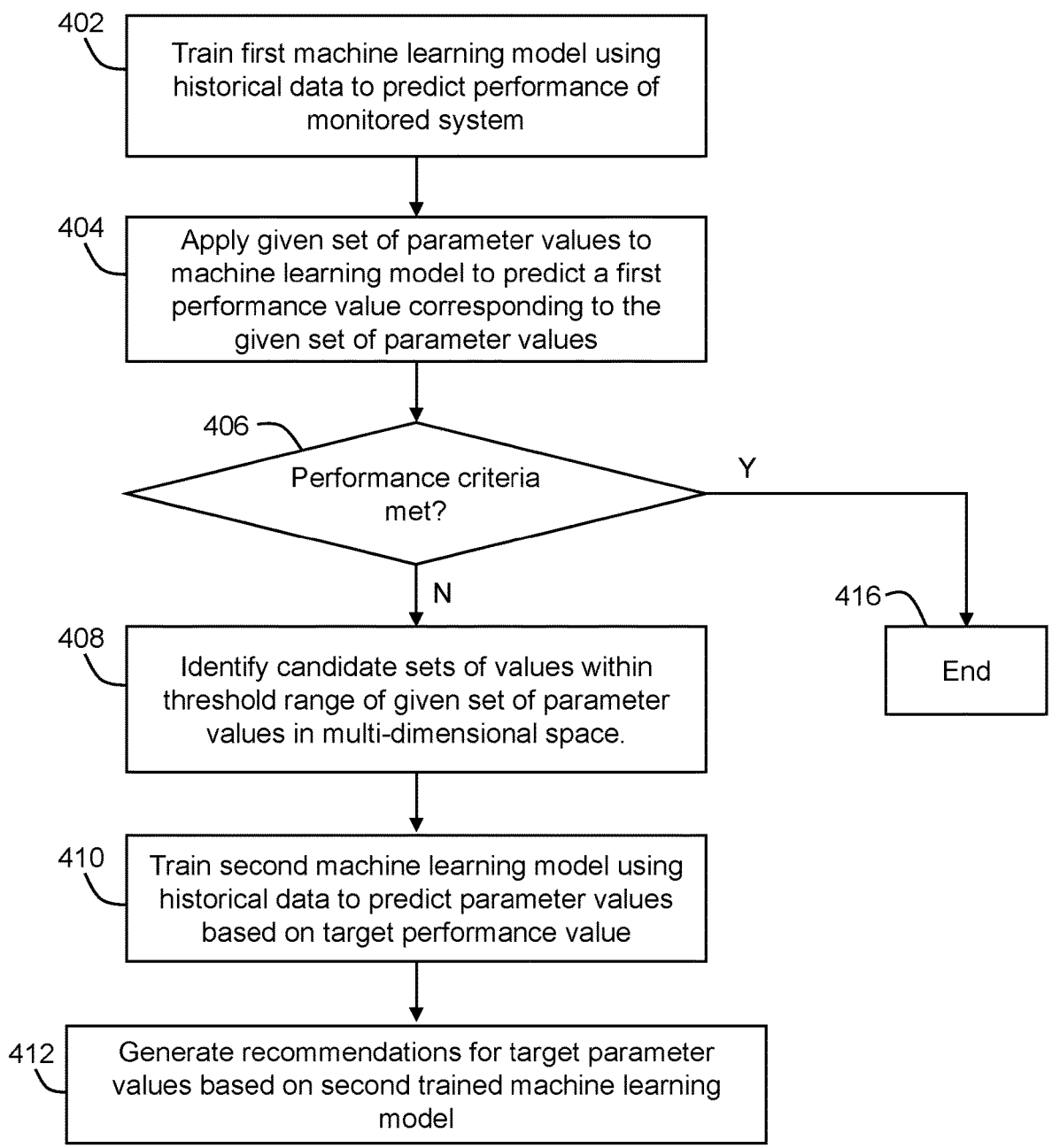
FIG. 4 illustrates an example set of operations for generating recommendations for target parameters in accordance with one or more embodiments.

In one or more embodiments, the system generates the recommendations for target parameter values of a monitored system by training a second computer learning model using a performance value of a first computer learning model. FIG. 4 represents an example set of operations for providing a user with a recommendation for configuring system parameters in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

The PR system trains a first machine learning model using the historical data to predict the performance of the monitored system with different sets of parameter values (Operation 402).

In one embodiment, the system trains the first machine learning model by providing the historical data to one or more machine learning algorithms.

The PR system receives a given set of parameter values, and applies the first machine learning model to the given set of parameter values to predict the performance of the device or system at the given set of parameter values (Operation 404).

In one embodiment, the given set of parameter values are values for operating parameters of a monitored system, and the predicted performance is a prediction of an operating state of the monitored system, such as a success or failure of the monitored system.

The PR system analyzes the first performance value of the monitored system corresponding to the given parameter(s) to determine whether performance criteria are met (Operation 406).

If the PR system determines that the performance criteria are met, the process ends (Operation 416).

If the PR system determines that the performance criteria are not met, the PR system identifies alternate sets of parameter values that may be used to predict corresponding performance (Operation 408). In at least one alternative embodiment, the PR system may skip operation 406 and may perform operation 408 regardless of whether the performance criteria are met.

Using the learned performance from training the first model, system defines sets of parameter values in the neighborhood of the given set of parameter values. In the present specification and claims, the neighborhood of the given set of parameter values refers to a predetermined range or combination of ranges of values of the parameters in a multi-dimensional space that are within a threshold range of the given parameter values.

The PR system then trains a second machine learning model using historical data corresponding to the parameter values in the neighborhood of the given set of parameter values to predict target parameter values (Operation 410).

In one embodiment, the PR system identifies one or more parameters, among the parameters used to train the first machine learning model, as target parameters. The target parameters may be selected by a user. Alternatively, the target parameters may be default target parameters defined by the PR system, or they may be selected in any other manner.

In one embodiment, a portion of multi-dimensional space representing candidate sets of parameter values may be applied to the machine learning model to constrain predicted configuration parameter values to the candidate sets of parameter values within the multi-dimensional space In one embodiment, the PR system trains the second machine learning model using, as inputs, (1) predefined environmental constraints, or fixed parameters, (2) a value, or range of values, corresponding to the previously-obtained performance value, and (3) a set of candidate values for the parameters other than the target parameters in the neighborhood of the previously-given parameter values in the multi-dimensional space. Using these inputs, the second machine learning model identifies a set of parameter values for the target parameters having a target performance value.

The performance value may be a binary value, such as success/failure, or any other type of value for which a user desires a recommendation. For example, the performance value may be a result of comparing a numerical value to a threshold, or the performance value may be any other value within a range determined by the configurable parameters. As an example, in an embodiment in which the first model predicts a performance value, "failure," for a given set of parameter values, the system may train a second model using, as an input a performance value, "success" to return only recommendations corresponding to a "success" determination of the system. As another example, in an embodiment in which the first model predicts a performance value of "less than 30," the system may train a second model using, as an input, a performance value of "50 or greater." The second model may then be used to provide one or more recommendations for configurable parameters of the system in which the performance value of a given parameter is 50 or greater.

The set of set of candidate values for the parameters other than the target parameters provided as the input to train the second machine learning model is based on the defined neighborhood corresponding to the given set of parameter values run through the first machine learning model.

The second machine learning model predicts a second performance of the monitored system. The second machine learning model generates recommendations for the one or more target parameters based on the identified set of parameter values having the target performance values (Operation 412). The recommendations may be a single recommendation for a combination of configurable parameters or multiple potential recommendations for configurations of the configurable parameters.

By the above operations, a first performance value obtained by running a first set of given parameter values through a first machine learning model may be converted into actionable recommendations by defining a neighborhood of configurable parameters around the first set of given parameter values and training a second machine learning model based on the defined neighborhood of configurable parameters and the performance value from the first set of given parameters.

6. Example Embodiment of Providing Actionable Recommendations for Configurable System Parameters A detailed example is described below for purposes of clarity. Components and/or operations described below should be understood as one specific example which may not be applicable to certain embodiments. Accordingly, components and/or operations described below should not be construed as limiting the scope of any of the claims.

Figure 5:
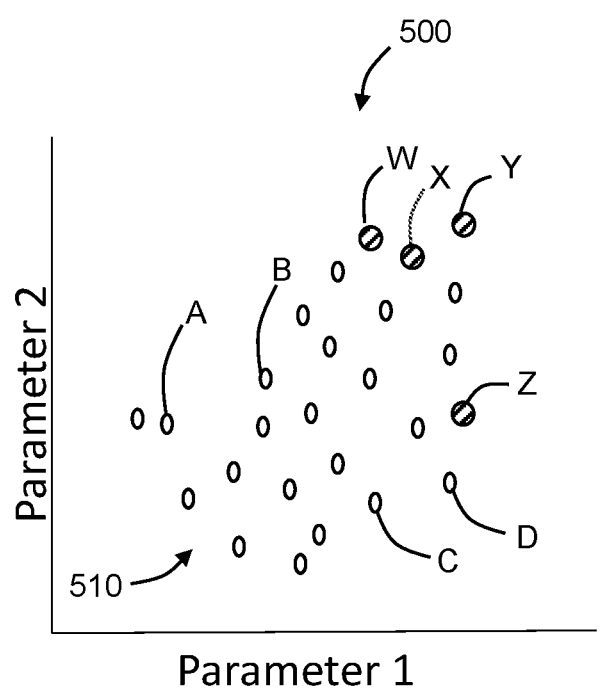
FIG. 5 illustrates an example of a machine learning model learning a range of potential values according to one or more embodiments.

FIG. 5 illustrates a graphical representation 500 of a first set of combinations of parameter values for a first parameter, parameter 1, and a second parameter, parameter 2. A prediction and recommendation system (PR system) trains a first machine learning model to learn a range of potential parameter values 510, shown in FIG. 5 as points extending from vertical and horizontal axes, and the state of a monitored machine at the respective combinations of values. In the example of FIG. 5, the small points, including representative points A, B, C, and D, represent a normal operating state of the monitored machine, and the points W, X, Y, and Z represent a failure state of the monitored machine. The points representing sets of parameter values resulting in the normal operating state of the monitored machine, including points A, B, C, and D, are represented in FIG. 5 by oval shapes having no fill. The points representing sets of parameter values resulting in the failed operating state of the monitored machine, including points W, X, Y, and Z, are represented in FIG. 5 by circular shapes having a diagonal pattern fill.

Figure 6:
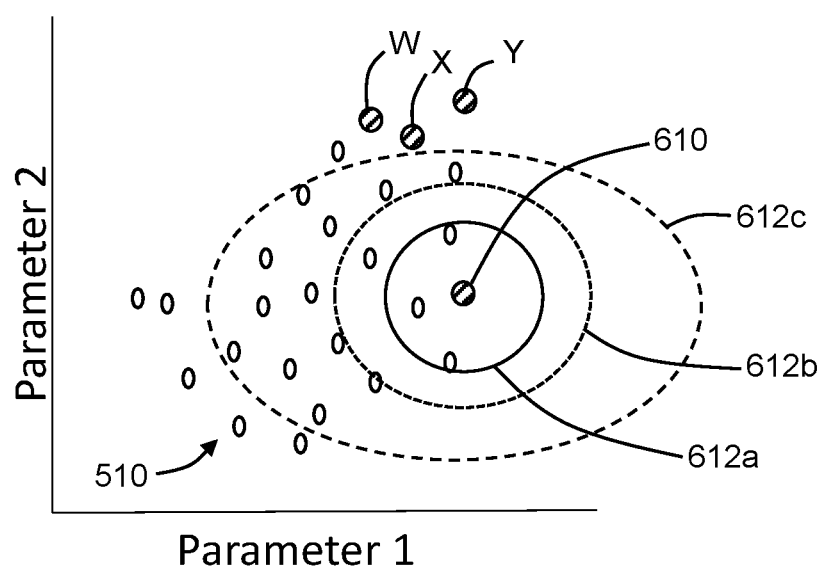
FIG. 6 illustrates an example of a machine learning model determining sample ranges around a data input value according to one or more embodiments.

As shown in FIG. 6, the PR system receives as an input a given set of parameter values 610. The first machine learning model determines that the given set of parameter values 610 corresponds to a particular performance value of the monitored system.

The PR system defines a neighborhood around the given set of parameter values 610 in the multi-dimensional space to be used to generate recommended configurable system parameter values. In FIG. 6, the circles 612a and 612b, and the ellipse 612c, represent different neighborhoods of data points, each data point representing a set of parameter values. As discussed above, the PR system defines the neighborhood around the given set of parameter values 610 by linear calculations, by logarithmic calculations, by applying parameter weights learned while training the first machine learning model, or by any other method.

Figure 7:
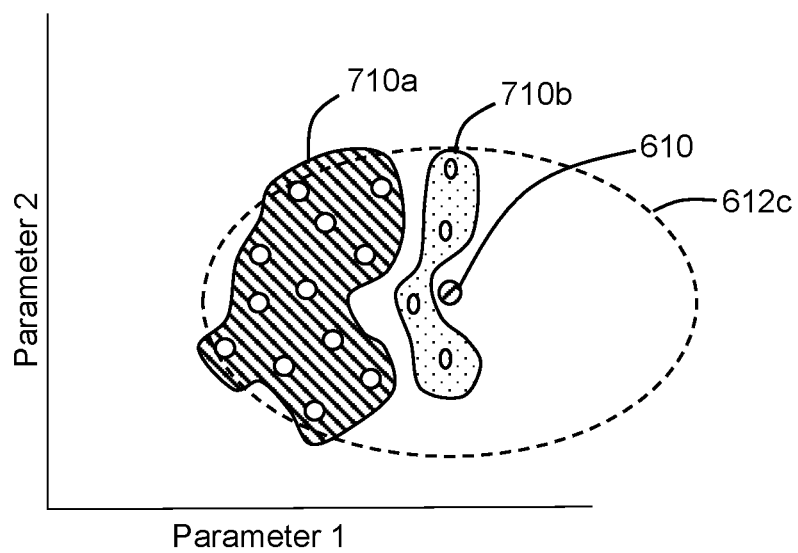
FIG. 7 illustrates an example of a machine learning model providing a range of recommended parameter values according to one or more embodiments.

As illustrate in FIG. 7, the PR system uses the performance value of the given parameters 610 in FIG. 6, as well as the sampled set of parameter values defined by the neighborhood 612c around the given parameters 610, as well as fixed environmental constraints of the monitored machine, to generate one or more recommendations for actionable parameter values. For example, in FIG. 7, the parameter combinations in the region 710a represent "highly-recommended" parameter combinations, and the parameter combinations in the region 710b represent "acceptable" parameter combinations. For example, if the parameter "parameter 1" corresponds to "temperature," the PR system may recommend the parameter combinations at lower operating temperatures more highly than parameter combinations at higher operating temperatures, which may extend a life of the monitored machine, or provide some other desired benefit.

While FIGS. 5-7 illustrate an example in which only two parameters are analyzed by the PR system, for purposes of providing a simple example for explanation, embodiments of the invention are not limited to analyzing or providing recommendations for only two parameters. Embodiments encompass multivariate systems including any number of parameters greater than two.

Figure 8:
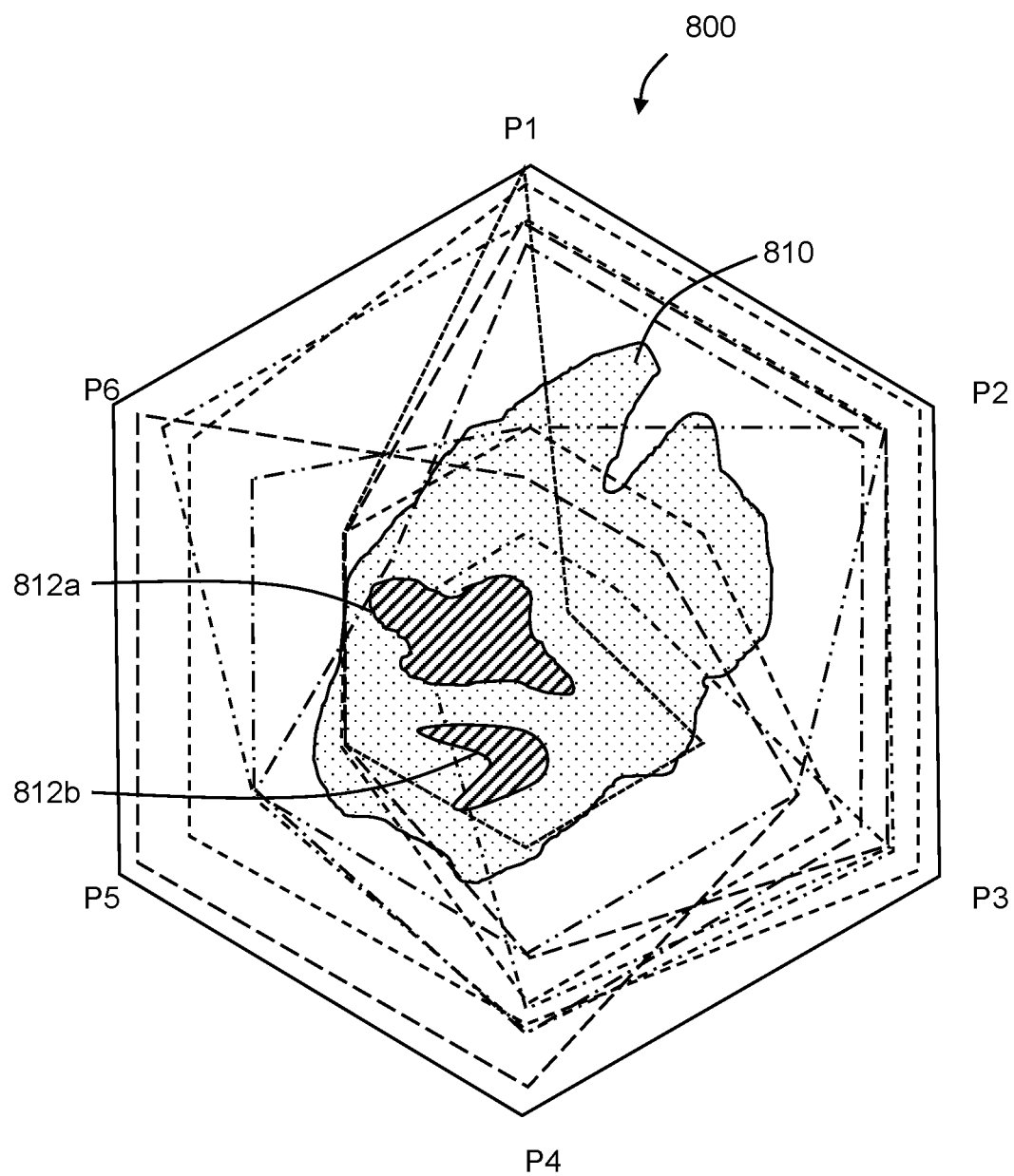
FIG. 8 illustrates an example of a machine learning model providing a range of recommended parameter values according to one or more embodiments.

FIG. 8 illustrates a graphical representation 800 of recommendations for combinations of parameter values in which recommendations are provided for six different parameters P1-P6. As shown in FIG. 8, the shape 810 represents a neighborhood of parameter values around given parameter values (not shown in FIG. 8), as discussed above, to generate non-contiguous ranges of parameter values 812a and 812b as recommendations. The recommendations 812a and 812b are non-contiguous and each include a plurality of parameter values for the six different parameters.

In an Internet of Things environment, or in any environment in which multiple different sensors or other input sources are provided to monitor a system, the complexity of inter-relationships between the different system parameters monitored by the sensors or other sources becomes more than a human is capable of calculating. In such a system, a machine-learning system may analyze the many different parameter inputs to identify patterns in the received inputs and train a machine learning model to predict performance values of the system for many different sets of parameter values.

In the embodiment illustrated in FIG. 8, the PR system receives a set of given parameters, generates the neighborhood 810 around the set of given parameter values to define a sample space, and trains a second machine learning model using the samples in the neighborhood 810, and using a target performance value as an input. The second machine learning model returns recommendations 812a and 812b to provide the user with ranges of values for parameters of the monitored system, thereby providing the user with actionable recommendations for operating the monitored system.

7. Computer Networks and Cloud Networks

In one or more embodiments, the PR system is connected to, or distributed across, a computer network. The computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 9:
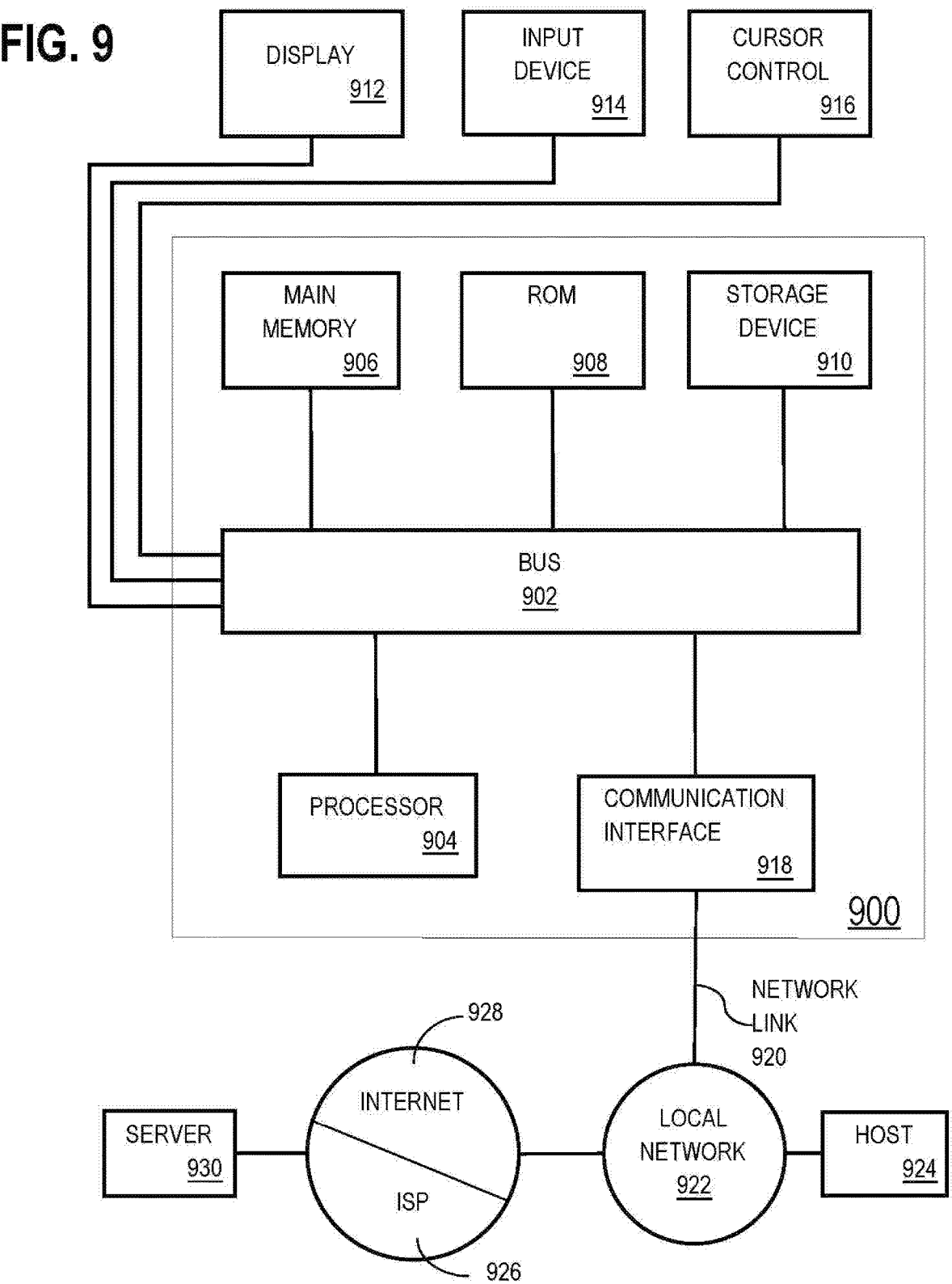
FIG. 9 shows a block diagram that illustrates a computer system in accordance with one or more embodiments.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general-purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, cause performance of operations comprising:
   generating a first machine learning model to predict performance values for a device, at least by:
      obtaining first training datasets comprising a plurality of data points, each training dataset comprising:
         a data point comprising a set of parameter values corresponding to a set of operation parameters of the device; and
         a performance value corresponding to a performance of the device;
      training the first machine learning model based on the first training datasets to predict the performance values for the device;
   applying a first data point, comprising a first set of values for a set of parameters for a target device, to the first machine learning model to predict a first performance value of the target device associated with the first data point;
   based at least on the first performance value meeting a selection criteria, mapping the first data point in a multi-dimensional space;
   generating, in the multi-dimensional space, a multi-dimensional boundary in relation to the first data point based on at least a multi-dimensional distance of a first set of data points, defining the multi-dimensional boundary, from the first data point;
   selecting a second set of data points within the multi-dimensional boundary;
   generating a second training dataset from the second set of data points;
   generating a second machine learning model based on training the second machine learning model with the second training dataset;
   selecting a third set of data points within the multi-dimensional boundary as candidate data points;
   for each particular candidate data point of the third set of data points:
      applying the particular candidate data point to the second machine learning model to predict a particular performance value of the target device corresponding to the particular candidate data point;
   identifying a subset of the candidate data points (a) with corresponding performance values that meet performance criteria and (b) that are within a threshold range from the first data point in the multi-dimensional space; and recommending, for the operation parameters of the target device, at least one candidate set of values corresponding to at least one candidate data point (a) with one or more corresponding performance values that meet the performance criteria and (b) that is within the threshold range from the first data point in the multi-dimensional space.

2. The one or more non-transitory computer-readable media of claim 1, wherein recommending the candidate set of values comprises recommending a section of the multi-dimensional space that includes the candidate set of values.

3. The one or more non-transitory computer-readable media of claim 2, wherein the section of the multi-dimensional space comprises multiple non-contiguous sections.

4. The one or more non-transitory computer-readable media of claim 1, the operations further comprising:
prior to applying the first set of values to the first machine learning model:
applying the first machine learning model to historical data to train the first machine learning model to the historical data to generate a first trained machine learning model,
wherein the first set of values is applied to the first trained machine learning model, and
wherein the historical data includes the candidate set of values for the set of operation parameters.

5. The one or more non-transitory computer readable media of claim 4, the operations further comprising:
based on training the first machine learning model to the historical data:
identifying the at least one candidate set of values as having a relationship with a performance of the target device that falls within a predetermined level of influence,
wherein identifying the at least one candidate set of values includes excluding additional sets of values, for the set of parameters, that have a relationship with the performance of the target device that falls outside the predetermined level of influence.

6. The one or more non-transitory computer readable media of claim 4, the operations further comprising:
identifying, based on training at least one of the first machine learning model and the second machine learning model, a second set of values, respectively, for at least one attribute of the set of operation parameters of the device;
assigning weights to the parameters based on the second set of values for the at least one attribute of the set of operation parameters of the device, at least by:
applying a first weight to a first parameter among the set of parameters, based on a first attribute value of the first parameter; and
applying a second weight to a second parameter among the set of parameters, based on a second attribute value for the second parameter,
wherein a shape of the multi-dimensional boundary is generated based on the multi-dimensional distance from the first data point and the weights assigned to the set of operation parameters of the device.

7. The one or more non-transitory computer readable media of claim 6, wherein the multi-dimensional boundary is defined, at least in part, by a logarithmic space around the first set of values, and
wherein a shape of the logarithmic space is defined by the weights assigned to the operation parameters of the device.

8. The one or more non-transitory computer readable media of claim 6, wherein applying the first set of values to the machine learning model to predict the first performance value of the target device associated with the first data point comprises sub-sampling a first parameter at a higher rate than a second parameter based on the first parameter having a higher weight value than the second parameter with respect to the performance criteria.

9. The one or more non-transitory computer readable media of claim 1, wherein a first range of potential values for the set of operation parameters of the device corresponding to the multi-dimensional boundary is defined, at least in part, by a linear space around the first set of values.

10. The one or more non-transitory computer readable media of claim 1, wherein the set of operation parameters of the device comprises configurable parameters.

11. The one or more non-transitory computer readable media of claim 1, wherein the set of operation parameters comprises sensor-detected data.

12. The one or more non-transitory computer readable media of claim 1,
wherein the first set of values for the set of operation parameters is applied to the first trained machine learning model to predict the first performance value of the target device,
wherein the first performance value is for a first parameter of the set of parameters,
wherein the operations further comprise:
training the second machine learning model with the second training dataset and based on a second performance value of the first parameter;
identifying at least one parameter of the set of operation parameters as a target parameter;
identifying a subset of operation parameters omitting the target parameter;
applying to the second machine learning model the third set of data points to identify a subset of the third set of data points with corresponding performance values that meet the performance criteria; and
recommending, for the operation parameters of the target device, parameter values corresponding to the subset of the third set of data points with corresponding performance values that meet the performance criteria.

13. The one or more non-transitory computer readable media of claim 1, the operations further comprising:
prompting a user to select one or more parameters, from among the set of operation parameters, to be recommended; and
responsive to the prompting, receiving a selection from the user of a subset of the one or more parameters,
wherein the candidate set of values is selected for the subset of the one or more parameters.

14. The one or more non-transitory computer readable media of claim 1, wherein the set of operation parameters is a multivariate set of parameters comprising more than two parameters.

15. The one or more non-transitory computer readable media of claim 1, wherein generating the second machine learning model comprises re-training the first machine learning model with the second training dataset.

16. The one or more non-transitory computer readable media of claim 1, wherein the third set of data points includes at least one of the second set of data points.

17. A method, comprising:
generating a first machine learning model to predict performance values for a device, at least by:
obtaining first training datasets comprising a plurality of data points, each training dataset comprising:
a data point comprising a set of parameter values corresponding to a set of operation parameters of the device; and
a performance value corresponding to a performance of the device;
training the first machine learning model based on the first training datasets to predict the performance values for the device;
applying a first data point, comprising a first set of values for a set of parameters for a target device, to the first machine learning model to predict a first performance value of the target device associated with the first data point;
based at least on the first performance value meeting a selection criteria, mapping the first data point in a multi-dimensional space;
generating, in the multi-dimensional space, a multi-dimensional boundary in relation to the first data point based on at least a multi-dimensional distance of a first set of data points, defining the multi-dimensional boundary, from the first data point;
selecting a second set of data points within the multi-dimensional boundary;
generating a second training dataset from the second set of data points;
generating a second machine learning model based on training the second machine learning model with the second training dataset;
selecting a third set of data points within the multi-dimensional boundary as candidate data points;
for each particular candidate data point of the third set of data points:
applying the particular candidate data point to the second machine learning model to predict a particular performance value of the target device corresponding to the particular candidate data point;
identifying a subset of the candidate data points (a) with corresponding performance values that meet performance criteria and (b) that are within a threshold range from the first data point in the multi-dimensional space; and
recommending, for the operation parameters of the target device, at least one candidate set of values corresponding to at least one candidate data point (a) with one or more corresponding performance values that meet the performance criteria and (b) that is within the threshold range from the first data point in the multi-dimensional space.

18. The method of claim 17, wherein recommending the candidate set of values comprises recommending a section of the multi-dimensional space that includes the candidate set of values.

19. The method of claim 18, wherein the section of the multi-dimensional space comprises multiple, non-contiguous sections.

20. The method of claim 17,
wherein the first set of values for the set of operation parameters is applied to the first trained machine learning model to predict the first performance value of the target device,
wherein the first performance value is for a first parameter of the set of parameters, wherein the operations further comprise:
training the second machine learning model with the second training dataset and based on a second performance value of the first parameter;
identifying at least one parameter of the set of operation parameters as a target parameter;
identifying a subset of operation parameters omitting the target parameter;
applying to the second machine learning model the third set of data points to identify a subset of the third set of data points with corresponding performance values that meet the performance criteria; and
recommending, for the operation parameters of the target device, parameter values corresponding to the subset of the third set of data points with corresponding performance values that meet the performance criteria.

21. A system, comprising:
one or more processors; and
memory storing instructions that, when executed by the one or more processors, cause the system to perform operations comprising:
generating a first machine learning model to predict performance values for a device, at least by:
obtaining first training datasets comprising a plurality of data points, each training dataset comprising:
a data point comprising a set of parameter values corresponding to a set of operation parameters of the device; and
a performance value corresponding to a performance of the device;
training the first machine learning model based on the first training datasets to predict the performance values for the device;
applying a first data point, comprising a first set of values for a set of parameters for a target device, to the first machine learning model to predict a first performance value of the target device associated with the first data point;
based at least on the first performance value meeting a selection criteria, mapping the first data point in a multi-dimensional space;
generating, in the multi-dimensional space, a multi-dimensional boundary in relation to the first data point based on at least a multi-dimensional distance of a first set of data points, defining the multi-dimensional boundary, from the first data point;
selecting a second set of data points within the multi-dimensional boundary;
generating a second training dataset from the second set of data points;
generating a second machine learning model based on training the second machine learning model with the second training dataset;
selecting a third set of data points within the multi-dimensional boundary as candidate data points;
for each particular candidate data point of the third set of data points:
applying the particular candidate data point to the second machine learning model to predict a particular performance value of the target device corresponding to the particular candidate data point;
identifying a subset of the candidate data points (a) with corresponding performance values that meet performance criteria and (b) that are within a threshold range from the first data point in the multi-dimensional space; and recommending, for the operation parameters of the target device, at least one candidate set of values corresponding to at least one candidate data point (a) with one or more corresponding performance values that meet the performance criteria and (b) that is within the threshold range from the first data point in the multi-dimensional space.

* * * * *

UNITED STATES PATENT AND TRADEMARK OFFICE
CERTIFICATE OF CORRECTION

| | | |
|---|---|---|
| PATENT NO. | : 12,223,397 B2 | Page 1 of 1 |
| APPLICATION NO. | : 17/007601 | |
| DATED | : February 11, 2025 | |
| INVENTOR(S) | : Vaid et al. | |

It is certified that error appears in the above-identified patent and that said Letters Patent is hereby corrected as shown below:

In the Specification

In Column 4, Line 30, delete "values," and insert -- values. --, therefor.

In Column 12, Line 17, delete "space" and insert -- space. --, therefor.

In the Claims

In Column 21, Line 8, in Claim 2, delete "computer-readable" and insert -- computer readable --, therefor.

In Column 21, Line 12, in Claim 3, delete "computer-readable" and insert -- computer readable --, therefor.

In Column 21, Line 16, in Claim 4, delete "computer-readable" and insert -- computer readable --, therefor.

Signed and Sealed this
Sixth Day of May, 2025

Coke Morgan Stewart
*Acting Director of the United States Patent and Trademark Office*